US008850267B2

(12) United States Patent
Aggarwal et al.

(10) Patent No.: US 8,850,267 B2
(45) Date of Patent: Sep. 30, 2014

(54) MIDDLEWARE FOR MULTIPROCESSOR SOFTWARE TESTING

(75) Inventors: Manish K. Aggarwal, Austin, TX (US);
Ravi K. Singh, Austin, TX (US);
Anuradha S. Rao, Austin, TX (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 170 days.

(21) Appl. No.: 13/565,137

(22) Filed: Aug. 2, 2012

(65) Prior Publication Data

US 2014/0040665 A1 Feb. 6, 2014

(51) Int. Cl.
*G06F 11/00* (2006.01)

(52) U.S. Cl.
USPC .......................................................... 714/33

(58) Field of Classification Search
CPC ..... G06F 11/22; G06F 11/36; G06F 11/3668; G06F 11/3672; G06F 11/3676; G06F 11/3684; G06F 11/3696
USPC .................. 714/25, 27, 32, 33, 38.1; 717/124
See application file for complete search history.

(56) References Cited

U.S. PATENT DOCUMENTS

| 6,993,747 | B1 | 1/2006 | Friedman | 717/124 |
|---|---|---|---|---|
| 7,107,173 | B2* | 9/2006 | Fritzsche | 702/122 |
| 7,117,484 | B2 | 10/2006 | Hartman et al. | 717/126 |
| 7,694,181 | B2* | 4/2010 | Noller et al. | 714/38.11 |
| 2004/0102187 | A1 | 5/2004 | Moller et al. | 455/418 |
| 2008/0120521 | A1* | 5/2008 | Poisson et al. | 714/26 |
| 2008/0120592 | A1 | 5/2008 | Tanguay et al. | 717/104 |
| 2009/0249121 | A1* | 10/2009 | Kube et al. | 714/32 |
| 2010/0058290 | A1 | 3/2010 | Williamson | 717/106 |
| 2011/0202301 | A1 | 8/2011 | Kim et al. | 702/108 |

OTHER PUBLICATIONS

Senouci, B., Bouchhima, A., Rousseau, F., Petrot, F., and Jerraya, A.; "Prototyping Multiprocessor System-on-Chip Applications: A Platform-Based Approach;" IEEE Distributed Systems Online; vol. 8, No. 5, May 2007; pp. 1-14.*

* cited by examiner

*Primary Examiner* — Scott Baderman
*Assistant Examiner* — Joseph Kudirka
(74) *Attorney, Agent, or Firm* — Christopher P. Maiorana, PC

(57) ABSTRACT

An apparatus having a memory and multiple processors coupled to the memory is disclosed. The memory may be configured to store middleware. One or more processors may be configured to (a) generate initial test vectors to test one or more software modules executed on the processors and (b) generate modified test vectors by translating the initial test vectors in the middleware to a format that matches multiple hardware dependencies of the processors and multiple software dependencies of multiple operating systems. The test vectors generally have another format that is independent of (a) the hardware dependencies of the processors and (b) the software dependencies of the operating systems executed by the processors. The processors may be configured to generate a plurality of test results by exercising the software modules with the modified test vectors.

20 Claims, 7 Drawing Sheets

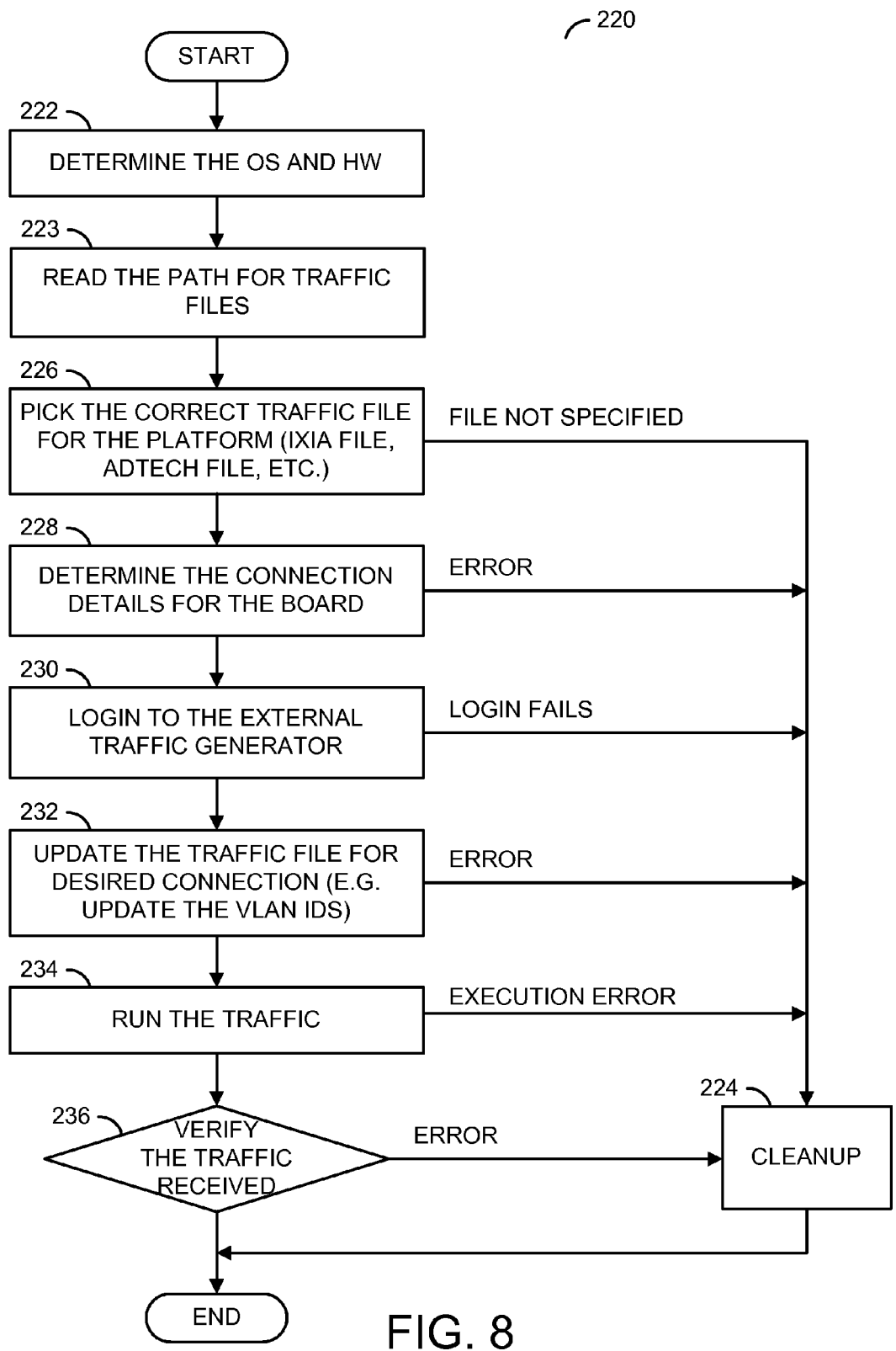

US 8,850,267 B2

MIDDLEWARE FOR MULTIPROCESSOR SOFTWARE TESTING

FIELD OF THE INVENTION

The present invention relates to software testing generally and, more particularly, to a method and/or apparatus for implementing middleware for multiprocessor software testing.

BACKGROUND OF THE INVENTION

Testing software that is executed on a multicore communications processor is complex due to dependencies of the processor hardware and configurations of the cores. Furthermore, multiple different operating systems are commonly executed on the different cores resulting in software dependencies for the tests. Different modes of the operating systems can also impact the test procedures.

It would be desirable to implement middleware for multiprocessor software testing.

SUMMARY OF THE INVENTION

The present invention generally concerns an apparatus having a memory and multiple processors coupled to the memory. The memory may be configured to store middleware. One or more processors may be configured to (a) generate initial test vectors to test one or more software modules executed on the processors and (b) generate modified test vectors by translating the initial test vectors in the middleware to a format that matches multiple hardware dependencies of the processors and multiple software dependencies of multiple operating systems. The test vectors generally have another format that is independent of (a) the hardware dependencies of the processors and (b) the software dependencies of the operating systems executed by the processors. The processors may be configured to generate a plurality of test results by exercising the software modules with the modified test vectors.

The objects, features and advantages of the present invention include providing middleware for multiprocessor software testing that may (i) operate in a symmetric multicore mode, (ii) operate in an asymmetric multicore mode, (iii) operate with heterogeneous CPU cores, (iv) operate with homogeneous CPU cores, (iv) abstract operating system dependencies, (v) abstract processor hardware dependencies, (iv) abstract operating system modes, (vii) align test applications to test execution dimensions, (viii) reduce turn around time for test execution and/or (ix) execute on a multicore communication processor.

BRIEF DESCRIPTION OF THE DRAWINGS

These and other objects, features and advantages of the present invention will be apparent from the following detailed description and the appended claims and drawings in which:

FIG. 8 is a flow diagram of an example operation of an external traffic driver module.

DETAILED DESCRIPTION OF THE PREFERRED EMBODIMENTS

Some embodiments of the present invention generally concern middleware that simplifies test application execution on a multicore communication processor (e.g., MCP) based systems. The middleware may abstract the operating systems functioning in symmetric or asymmetric multicore modes on different processor architectures. The multicore communication processor may operate in a symmetric multicore mode and an asymmetric multicore mode using heterogeneous or homogeneous central processing unit (e.g., CPU) cores. The middleware generally abstracts the operating systems, operating system modes, and CPU core architectures to make the test application align to multiple dimensions of a test execution. As such, the middleware generally provides for seamless test development and regression that may lead to multifold reduced turnaround time for test execution.

Figure 1:
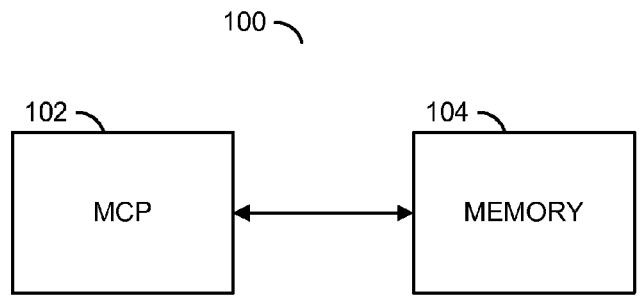
FIG. 1 is a block diagram of a multicore communication processor system.

Referring to FIG. 1, a block diagram of a system 100 is shown. The system (or apparatus, or device or integrated circuit) 100 may be implemented as a multicore communication processor system. The apparatus 100 generally comprises a block (or circuit) 102 and a block (or circuit) 104. The circuits 102 to 104 may represent modules and/or blocks that may be implemented as hardware, software, a combination of hardware and software, or other implementations.

The circuit 102 may implement a multicore processor circuit. The circuit 102 is generally operational to execute software programs, middleware and/or firmware stored in the circuit 104. Execution of the software/middleware/firmware (or instructions) may provide multiple communications capabilities, such as 3G/4G mobile access systems, mobile broadband radio network controller applications and/or enterprise gateways. Other processor technologies may be implemented to meet the criteria of a particular application. In some embodiments, the circuit 102 may be implemented (or fabricated) as one or more chips (or die or integrated circuits).

The circuit 104 may implement a memory circuit. The circuit is generally operational to (i) store the instructions and data consumed by the circuit 102 and (ii) store the data created by the circuit 102. In some embodiments, the circuit 104 may implement one or more double data rate type-three synchronous dynamic random access memories. Other memory technologies may be implemented to meet the criteria of a particular application. In some embodiments, the circuit 104 may be implemented (or fabricated) as one or more chips (or die or integrated circuits) separate from the circuit 102. In other embodiments, the circuit 104 may be implemented in (on) the same chips as the circuit 102.

Figure 2:
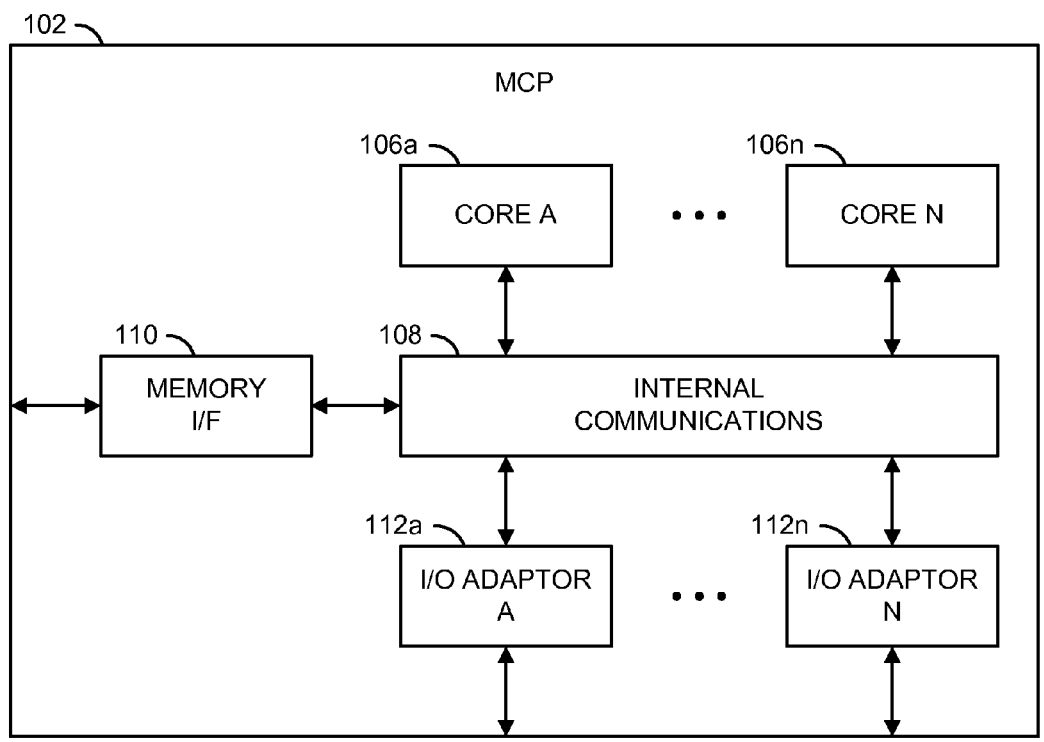
FIG. 2 is a block diagram of an example implementation of a multicore communication processor.

Referring to FIG. 2, a block diagram of an example implementation of the circuit 102 is shown. The circuit 102 generally comprises multiple blocks (or circuits) 106a-106n, a block (or circuit) 108, one or more blocks (or circuits) 110 and one or more blocks (or circuits) 112a-112n. The circuits 106a to 112n may represent modules and/or blocks that may be implemented as hardware, software, a combination of hardware and software, or other implementations.

Each circuit 106a-106n may implement a CPU (or processor) core. The circuits 106a-106n are generally operational to execute the instructions received from the circuit 104 to perform the various functions of the system 100.

The circuit 108 may implement an internal communication circuit. The circuit 108 is generally operational to provide communications among the circuits 106a-106n, 110 and 112a-112n. The circuit 108 may include, but is not limited to, caching capabilities, security processing, scheduler operations and timer management operations.

The circuit 110 may implement a memory interface circuit. The circuit 110 is generally operational to exchange data and instructions between the circuit 102 and the circuit 104. The circuit 110 may communicate directly with the circuit 108.

Each circuit 112a-112n may implement an input/output (e.g., I/O) adaptor circuit. The circuits 112a-112n may be operational to exchange data between the circuit 102 and other external circuitry through a variety of I/O capabilities. The circuits 112a-112n may include, but are not limited to, a serialization/deserialization (e.g., SERDES) interface, an Ethernet interface, a Universal Serial Bus-2 (e.g., USB2) interface, a dual universal asynchronous receiver/transmitter (e.g., DUART) interface, and I2C interface and/or a general purpose input/output (e.g., GPIO) Other I/O adaptor may be implemented to meet the criteria of a particular application.

Figure 3:
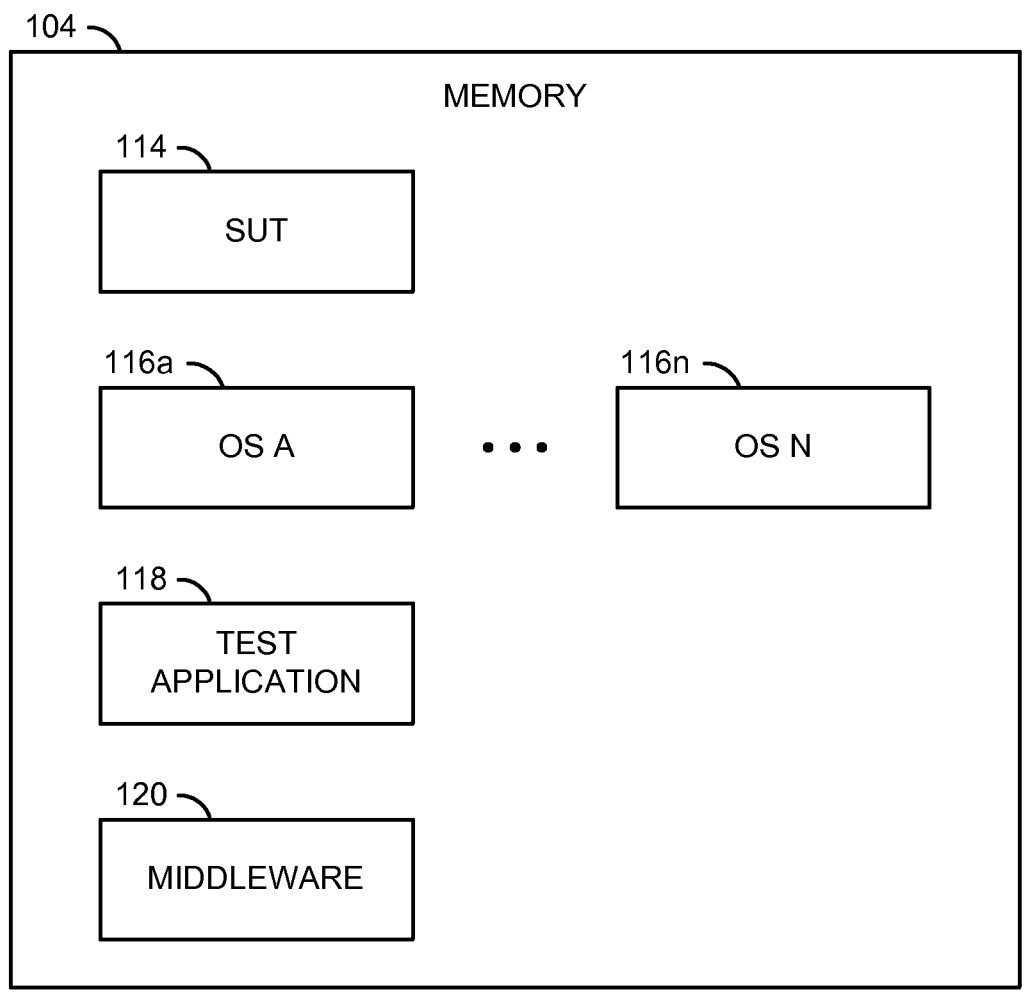
FIG. 3 is a block diagram of an example file storage within a memory circuit.

Referring to FIG. 3, a block diagram of an example file storage within the circuit 104 is shown. The circuit 104 generally stores a module (or file) 114, multiple modules (or files) 116a-116n, a module (or file) 118 and a module (or file) 120. The modules 114 to 120 may represent modules and/or blocks that may be implemented as software, firmware, middleware a combination of software, firmware and middleware, or other implementations.

The module 114 may implement a software under test module. The module 114 may be executed on one or more of the circuits 106a-106n. Testing of the module 114 may be performed by the module 118 through the module 120.

Each module 116a-116n may implement one of multiple different operating systems. The modules 116a-116n may be executed by the circuits 106a-106n. Different combinations of the modules 116a-116n may be executed in parallel by different circuits 106a-106n. Each module 116a-116n may also be operated in several different modes, a mode at a time. Each module 116a-116n generally has a corresponding set of software dependencies, such as interfaces, timing, communication protocols, resource allocations and the like. In some embodiments, the module 114 may be designed to account for the software dependencies of one or more of the modules 116a-116n. In other embodiments, the module 114 may be designed to a different set of dependencies than the software dependencies of the modules 116a-116n. In such situations, the module 120 and/or other software may be created to link the module 114 with one or more of the modules 116a-116n.

The module 118 may be implemented as a test application module. The module 118 is generally operational to generate a set of test vectors used to exercise (or stimulate) the module 114, the modules 116a-116n and/or hardware elements of the circuit 102 to conduct each test. The module 118 may also be operational to receive and analyze results generated during the tests.

The module 120 may implement middleware. The module 120 may be operational to abstract the software dependencies of the modules 116a-116, the modes of the modules 116a-116n, and the hardware dependencies of the circuit 102 to make the test application align to multiple dimensions of a test execution. The module 120 may generate a plurality of modified test vectors by translating the test vectors received from the module 118 to another format that matches the hardware dependencies and the software dependencies of the system 100.

The module 120 is generally used to test the module 114, the modules 106a-106n in the various modes and core specific software layers of the modules 116a-116n, which may provide user level application programming interfaces (e.g., API) to program the hardware of the circuit 102. The module 120 may provide interfaces for both one or more control planes and one or more data planes.

The module 120 may work remotely, if the target hardware is on a network. A layer in the module 120 generally manages login and execution of tests in different test bench setups. The module 120 may also take care of resource management tasks (e.g., load balancing and scheduling test tasks) in case multiple test suites are being executed on multiple hardware platforms.

Figure 4:
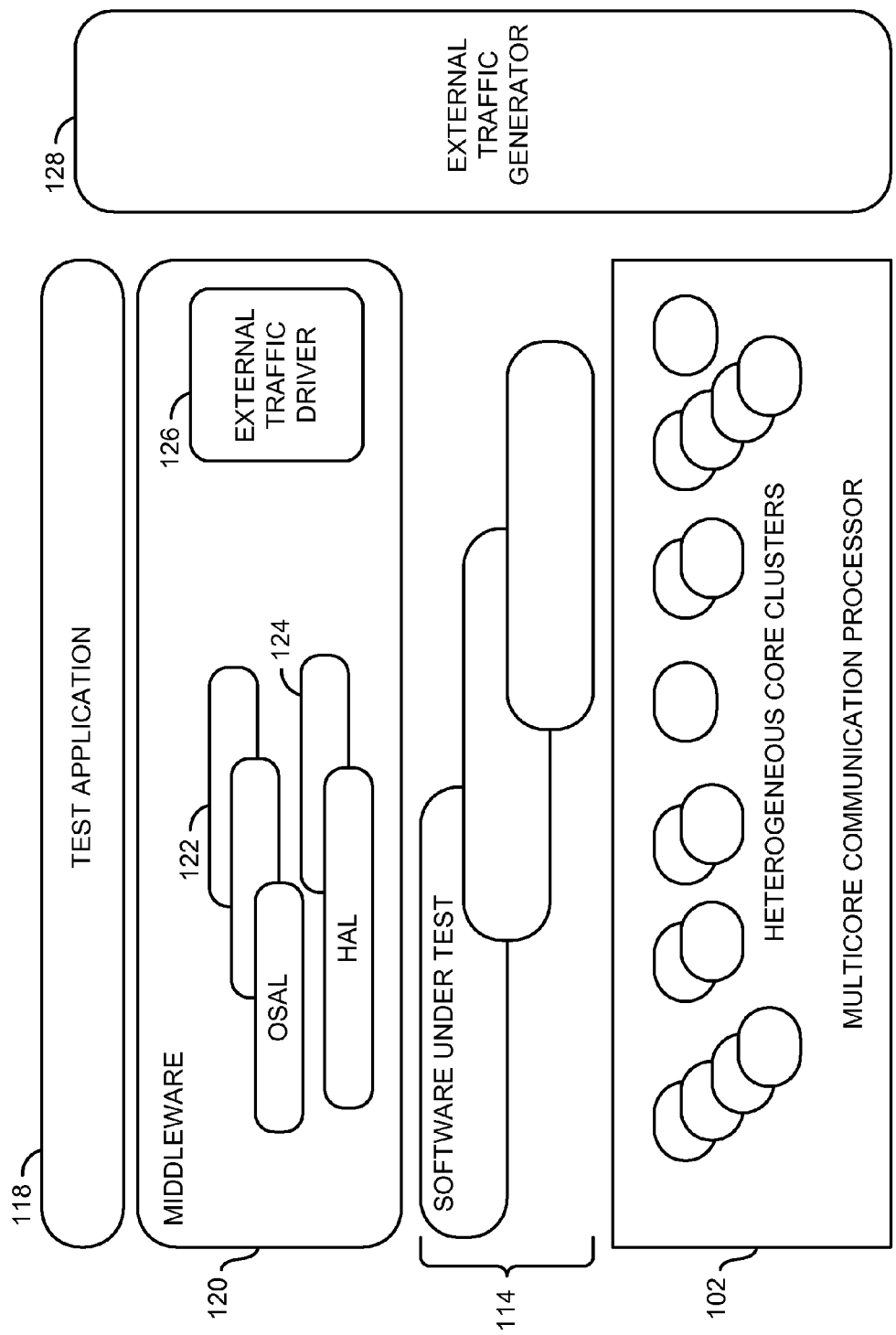
FIG. 4 is a diagram of an example configuration of system in accordance with a preferred embodiment of the present invention.

Referring to FIG. 4, a diagram of an example configuration of the hardware and software of the system 100 is shown in accordance with a preferred embodiment of the present invention. The configuration generally comprises the module 118 in communication with the module 120. The module 120 may be in communication with the module 114 and the circuit 102. The module 120 generally comprises multiple modules (or files) 122, multiple modules (or files) 124 and a module (or file) 126. The configuration may include an optional module (or file) 128. The modules 122 to 128 may represent modules and/or blocks that may be implemented as software, firmware, middleware a combination of software, firmware and middleware, or other implementations.

The modules 122 may implement an operating system abstraction layer (e.g., OSAL). The modules 122 may be operational to abstract the operating system specific application dependencies, leading to operating system independent code. The module 122 may also enables users to execute test suites for different modes of the modules 116a-116n. The modes may include, but are not limited to, a symmetric multicore processing (e.g., SMP) mode and an asymmetric multicore processing (e.g., AMP) mode to test the software developed for circuit 102. The module 120 may support VxWorks, Linux and OSE forms of operating systems. Other operating systems may be implemented to meet the criteria of a particular application. Multiple instances of the modules 122 may be provided to support each cluster of the modules 116a-116n.

The modules 124 may implement a hardware abstraction layer (e.g., HAL). The modules 124 may be generally operational to provide the CPU core architecture independent functionalities used by the module 118. The functionalities may include, but are not limited to, providing the CPU core clock ticks and performance monitors for doing performance tests. The modules 124 may provide support for both heterogeneous CPU cores and homogeneous CPU cores. Typical multicore systems may include specific CPU cores (or processors), for example PPC476 cores, ARM A9 cores, ARM A15 cores, x86 cores, MIPS cores, and the like. Furthermore, some circuits 112a-112n (e.g., PCIe adaptors and/or SRIO adaptors) generally enables the circuits 106a-106n to connect with other CPU core types, leading to a heterogeneous computing environment. Multiple instances of the modules 124 may be provided to support each cluster of the circuits 106a-106n. The modules 124 may also support the execution of a test suite on instruction set simulators.

The module 126 may implement a traffic generation driver (e.g., TGD). Many hardware accelerators may be provided within the circuit 102. The hardware accelerators may be used in different computing models such as complete off load, a look aside model and similar operations. Some hardware accelerators may be configured as input/output adaptors (e.g., the circuits 112a-112n) that inject traffic into the circuit 102. For example, some circuits 112a-112n may be implemented as Ethernet interfaces (XAUI, XFI, SGMII, GMII, etc.), TDM interfaces, SONET interfaces and the like. In order to test the setups of the circuits 112a-112n, one or more modules 126 may be used to observe the correct behavior.

The module 128 may implement a traffic generator module. The module 128 is generally operational to create additional test vectors. The test vectors may be inserted into the circuit 102 through the circuits 112a-112n and the corresponding modules 126. An example implementation of the module 128 may be an IXIA-based traffic generator from the IXIA Corporation, Calabasas, Calif.

A file system mapping (e.g., FSM) of the system 100 to the target hardware (e.g., application specific integrated circuit or field programmable gate array) or to an instruction set simulator (e.g., ISS) may be dependent on the operating systems and operating system modes. File mapping systems supported by the module 120 generally include, but are not limited to, a network file system (e.g., NFS) based mapping, a filter transfer protocol (e.g., FTP) based mapping, and virtual file system based mapping. Other file mapping systems may be implemented to meet the criteria of a particular application.

Figure 5:
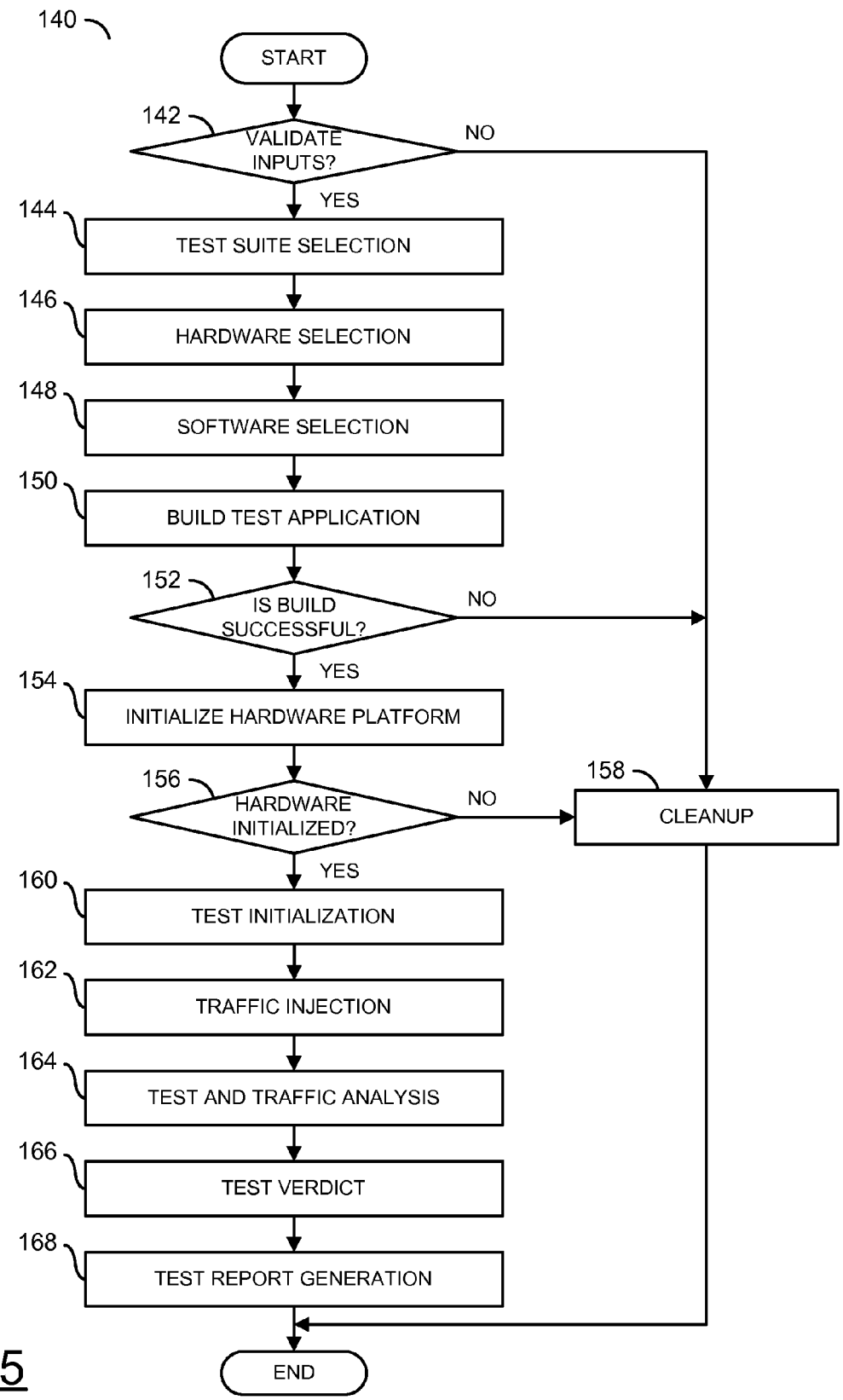
FIG. 5 is a flow diagram of an example test execution method.

Referring to FIG. 5, a flow diagram of an example test execution method 140 is shown. The method (or process) 140 may utilize the module 120 executing in the circuit 102 (e.g., executed by one or more of the circuits 106a-106n). The method 140 generally comprises a block (or step) 142, a block (or step) 144, a block (or step) 146, a block (or step) 148, a block (or step) 150, a block (or step) 152, a block (or step) 154, a block (or step) 156, a block (or step) 158, a block (or step) 160, a block (or step) 162, a block (or step) 164, a block (or step) 166 and a block (or step) 168. The steps 142-168 may represent modules and/or blocks that may be implemented as hardware, software, a combination of hardware and software, or other implementations. The method 140 may be performed by the system 100.

A check may be performed in the step 142 for an input validation. During the input validation, test arguments passed to the module 118 may be parsed. The module 120 may rely on a user to specify the hardware platform and the software platform on which the module 118 may be executed. In a case where the hardware platform does not exist and/or the software platform is not supported, the method 140 may provide one or more notifications to the user in the step 158.

In the step 144, the method 140 may provide a set of menus to the user. The menus generally display all the test applications available to the user. A user may select one or more applications for execution. Application arguments are generally pre-populated. The user may also specify any "optional" test arguments, not already specified, in the step 144. If the optional test arguments are not specified, default values may be taken as the entries.

In the steps 146 and 148, the user generally specifies the hardware board and the software platform on which the test may be run. The hardware/software selection information is generally provided by the user. The method 140 may also check that the board is booting the same operating systems and correct mode (e.g., the SMP mode or the AMP mode), as specified in the software platform. If an error occurs, the method 140 may continue with the step 158 where corresponding error notifications may be presented to the user and the method exits gracefully.

In the step 150, a test suite may be built with a CPU core specific compiler tool chain and for the user specified operating systems and modes. The module 120 may build (or compile) the applications for the specified hardware and software during the step 150. The module 120 may generate appropriate test vectors in executable formats (e.g., executable files) based upon the operating systems, operating system modes and CPU cores.

A check may be performed in the step 152 to determine if the build was successful. If errors remain, the method 140 may continue with the step 158 where error notifications are presented to the user. The method 140 may subsequently terminate.

If the build was successful, the module 120 is generally responsible in the step 154 for hardware and/or instruction set simulator (e.g., ISS) initialization. The initialization may create the test environment as specified by the user. The step 154 may include hardware and/or ISS power cycling and operating system booting in the user-specified mode (e.g., the SMP mode or the AMP mode) in the user-defined clusters of CPU cores. Once the hardware initialization has completed, a check may be performed at the step 156 to verify that the hardware was properly initialized. If an error occurs during the hardware initialization, the method 140 may continue by reporting the error in the step 158.

Once the hardware has been initialized, the tests specified by the user may be initialized in the step 160. In the step 162, traffic injection (e.g., test vector injection) may be performed. In multicore communication processors, the software generally provides (i) one or more control planes and (ii) one or more data plane capabilities. In order to test the module 114, the test vectors may be generated by the module 118 and/or the module 128 and transferred to the module 120 on corresponding interfaces. The module 120 may translate (or modify) the test vectors into a new set of test vectors appropriate for the software dependencies and the hardware dependencies. The new test vectors may be used to exercise the module 114 to conduct the tests. In some situations, the traffic generated by the module 128 may override the user-specified fields in a generic traffic generation configuration. For example, the external traffic may override the virtual local area network (e.g., VLAN) identification and differentiated services code point (e.g., DSCP) settings.

In the step 164, the module 118 and/or 120 may analyze the results of the test. The module 120 generally provides functionality to validate both the application programming interface level functionality and the data path functionality. The module 118 may expect that all the packets sent from module 128 were received back. In such a case, the module 118 may wait until all of the packets are processed. The module 118 may subsequently display statistics for the packets, such as a count of the sent packets and a count of the received packets. The module 120 may also provide functionality to validate an integrity of the packets received from the multicore communication processor. In some embodiments, the module 120 may decrypt packets received in an encrypted form. In the step 166, the module 118 may generate a verdict for each test run.

The module 120 generally provides functionality to generate multiple levels of test report generation. The test reports may be created in the step 168. The functionality provided by the module 120 may include, but is not limited to, saving test logs and reports that span over multiple software release cycles, and provide crawl charts that may illustrate a progress from the pass/fail metric and from number of test suites.

Figure 6:
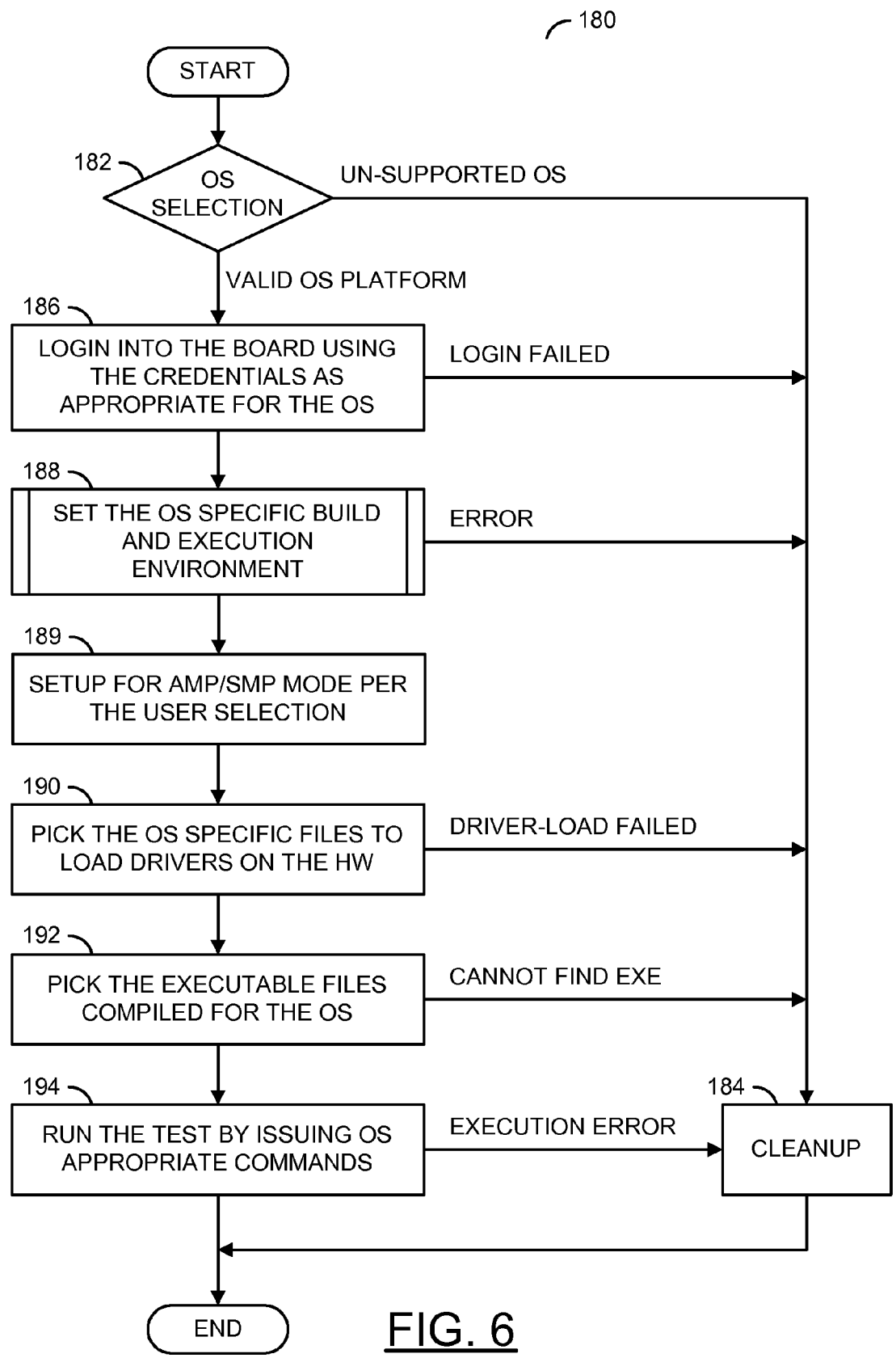
FIG. 6 is a flow diagram of an example operation of operating system abstraction layer modules.

Referring to FIG. 6, a flow diagram of an example operation (or method) 180 of the modules 122 is shown. The method (or process) 180 may execute in the circuit 102 (e.g., executed by one or more of the circuits 106a-106n). The method 180 generally comprises a block (or step) 182, a block (or step) 184, a block (or step) 186, a block (or step) 188, a block (or step) 189, a block (or step) 190, a block (or step) 192 and a block (or step) 194. The steps 182-194 may represent modules and/or blocks that may be implemented as hardware, software, a combination of hardware and software, or other implementations. The method 180 may be performed by the system 100.

The modules 122 may be operational to abstract the operating system specific application dependencies. In particular, the modules 122 may select one or more operating systems to be used in the testing of the module 114 in the step 182. If any of the selected operating systems are unsupported, the method 180 may continue with the step 184. In the step 184, the modules 122 may perform cleanup operations and subsequently end the tests.

If all of the selected operating systems are available, the modules 122 may log into the circuit 102 using credentials appropriate for the selected operating systems. If the login fails, the method 180 may proceed to the step 184, perform the cleanup and end. Otherwise, the modules 122 may set one or more operation specific build and execution environments in the step 188. If one or more errors occur, the method 180 may continue with the step 184.

In the step 189, the modules 122 may prepare the test bed for the user-selected operating system (e.g., prepare for the AMP mode or the SMP mode), select a correct operating system kernel and bring up the circuits 106a-106n in the selected mode. In the step 190, the modules 122 may select operating system specific drivers for the selected operating systems from one or more files. The selections may be based on the user inputs received in the step 148. The drivers may be loaded on the circuit 102 by the modules 122 as part of the step 190. Should any driver fail to load, the modules 122 may perform one or more appropriate cleanup tasks in the step 184.

In the step 192, the modules 122 may select one or more of the executable files that have been previously complied (step 150) for the selected operating systems and stored in the circuit 104. The executable files may be the test applications that the user wants to verify on the circuit 102. If any of the executable files cannot be found, the modules 122 may continue with the cleanup in the step 184. Otherwise, the modules 122 may run the tests in the step 194 by issuing appropriate commands for the selected operating systems. If one or more errors occur during the execution, the step 184 may be performed and the method 180 ended. At the end of the test execution, the method 180 may end.

Figure 7:
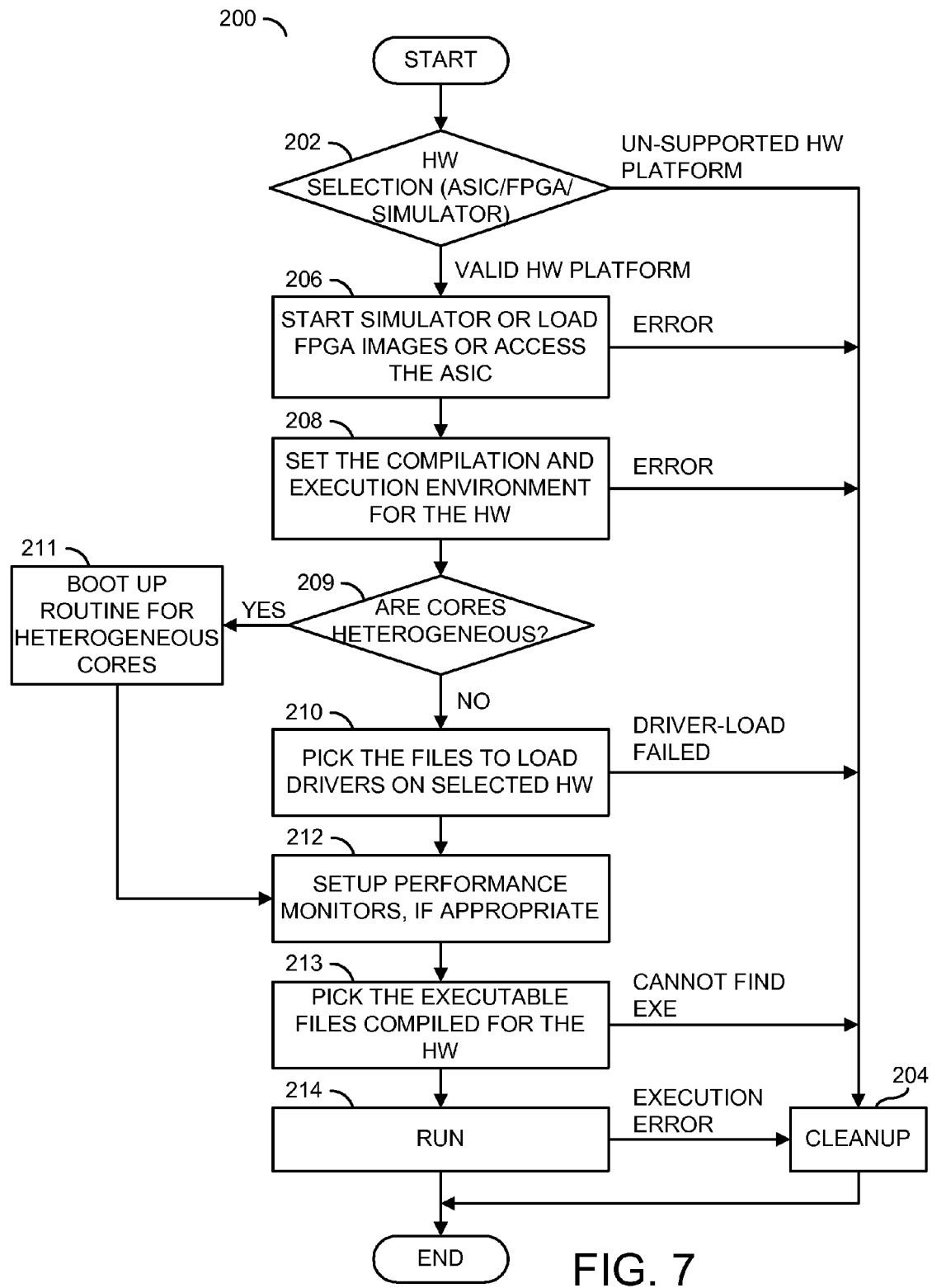
FIG. 7 is a flow diagram of an example operation of hardware abstraction layer modules.

Referring to FIG. 7, a flow diagram of an example operation (or method) 200 of the modules 124 is shown. The method (or process) 200 may execute in the circuit 102 (e.g., executed by one or more of the circuits 106a-106n). The method 200 generally comprises a block (or step) 202, a block (or step) 204, a block (or step) 206, a block (or step) 208, a block (or step) 209, a block (or step) 210, a block (or step) 211, a block (or step) 212, a block (or step) 213 and a block (or step) 214. The steps 202-214 may represent modules and/or blocks that may be implemented as hardware, software, a combination of hardware and software, or other implementations. The method 200 may be performed by the system 100.

The modules 124 may be generally operational to provide the CPU core architecture independent functionalities used by the module 118. In the step 202, the modules 124 may select the hardware platform on which the test is to be conducted. The selections may be based on the user inputs received in the step 146. If the hardware is unsupported, the modules 124 may perform cleanup operations in the step 204. Once the cleanup operations have finished, the modules 124 may end the method 200.

If the selected hardware platform is available, the modules 124 may start a simulation, load FPGA (e.g., field programmable gate array) images or access the ASIC (e.g., application specific integrated circuit) circuitry of the circuit 102 in the step 206. If an error occurs during the step 206, the modules 124 may continue the method 200 with the cleanup operations in the step 204 and end the test.

In the step 208, the modules 124 may set up a compilation and execution environment for the hardware. If an error occurs during the setup, the method 200 may continue with the cleanup in the step 204. A check may be performed in the step 209 to determine if the circuits 106a-106n are heterogenous or homogeneous. If the circuits 106a-106n are homogenous, the method 200 may continue with the step 210.

In the step 210, the modules 124 may select the appropriate driver files for the hardware platform. The drivers may be loaded on the circuit 102 as part of the step 210. If one or more drivers fail to load, the modules 124 may continue with the cleanup step 204 and end the test.

If the circuits 106a-106n were found to be heterogenous in the step 209, the method may continue with the step 211. In the step 211, the modules 124 may boot up one or more routines for the heterogenous cores. After the step 210 or 211, the modules 124 may setup performance monitors as appropriate in the step 212.

The modules 124 may select the executable files compiled (step 150) to support the testing of the modules 114 on the circuit 102 in the step 213. The executable files are generally the test applications that the user wants to verify on the circuit 102 and may be stored in the circuit 104. The executable files may be run by the modules 124 in the step 214. If one or more executable files cannot be found and/or any execution errors occur, the modules 124 may end the test and proceed to the cleanup in the step 124. Once the testing is complete, the modules 124 may end the method 200.

Referring to FIG. 8, a flow diagram of an example operation (or method) 220 of the module 126 is shown. The method (or process) 220 may execute in the circuit 102 (e.g., executed by one or more of the circuits 106a-106n). The method 220 generally comprises a block (or step) 222, a block (or step) 223, a block (or step) 224, a block (or step) 226, a block (or step) 228, a block (or step) 230, a block (or step) 232 and a block (or step) 234. The steps 222-234 may represent modules and/or blocks that may be implemented as hardware, software, a combination of hardware and software, or other implementations. The method 220 may be performed by the system 100.

In the step 222, the module 126 may determine which configurations of the operating systems and the hardware are being used in the test. The user may have an option to specify a path and name of one or more traffic files in the step 223. The user-specified traffic files may be selected by the module 126 from a directory in the step 226 to account for the determined operating systems and the hardware platform. The directory is generally the same directory used for one or more test cases. The traffic files may include, but are not limited to, IXIA files and Adtech files (Adtech Inc., Honolulu, Hi.). If one or more of the traffic files are not specified, the module 126 may proceed to the step 224 where cleanup operations may be performed. After the cleanup is complete, the test may end.

In the step 228, the module 126 may determine one or more connection details for the circuit 102. If an error occurs, the module 126 may continue the method 220 with the step 224 for cleanup operations. If the connections are good, the module 126 may log into to the module 128 in the step 230. Failure to log in may cause the module 126 to continue with the cleanup tasks in the step 224.

In the step 232, the module 126 may update the traffic files for a proper connection to the module 128. The module 128 may have multiple cards. Each card may have one or more unique numbers (or addresses). The updating generally includes, but is not limited to, updating a virtual local area network (e.g., VLAN) identifications and aligning the traffic file for the card in use. The alignment may be performed based on a table. The table generally maintains a mapping as specified to the user test environment. If an error occurs during the updating, the module 126 may proceed to the step 224 for the cleanup task.

During the test, the module 126 may verify that the intended traffic is being received from the module 128 in the step 236. The module 126 may also verify that the outgoing traffic generated by the module 114 under test is correct in the step 236. The verification may continue until the test ends. The module 126 generally keeps track of the packets sent and verify a packet count that has been received. Thus, the module 126 may verify that the expected number of packets has been received or not. If one or more errors arise in the received traffic during the test, the module 126 may continue the method 220 with the cleanup tasks in the step 224.

The functions performed by the diagrams of FIGS. 1-8 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a hardware circuit including memory configured to store middleware; and
   a plurality of processors coupled to said memory, wherein (i) one or more of said processors is configured to (a) generate a plurality of initial test vectors to test one or more software modules executed on said processors and (b) generate a plurality of modified test vectors translated from said initial test vectors by executing said middleware, (ii) a format of said modified test vectors matches (a) a plurality of hardware dependencies of said processors and (b) a plurality of software dependencies of a plurality of operating systems executed by said processors, (iii) said initial test vectors have another format that is independent of (a) said hardware dependencies of said processors and (b) said software dependencies of said operating systems and (iv) said processors are configured to generate a plurality of test results by exercising said software modules with said modified test vectors.

2. The apparatus according to claim 1, wherein said processors form part of a multicore communication processor.

3. The apparatus according to claim 1, wherein said middleware comprises an operating system abstraction layer configured to abstract said software dependencies of said operating systems such that said modified test vectors function with each of said operating systems.

4. The apparatus according to claim 1, wherein said middleware comprises an operating system abstraction layer configured to load one or more drivers specific to said operating systems.

5. The apparatus according to claim 1, wherein said middleware comprises a hardware abstraction layer configured to abstract said hardware dependencies of said processors such that said modified test vectors function with one or more of (i) a homogeneous cluster of said processors and (ii) a heterogeneous cluster of said processors.

6. The apparatus according to claim 5, wherein said hardware abstraction layer is further configured to select one or more executable files that have been compiled for said processors.

7. The apparatus according to claim 1, wherein said middleware comprises a traffic generation driver configured to generate one or more of said modified test vectors by translating a plurality of driver test vectors received from a traffic generator external to said processors.

8. The apparatus according to claim 1, wherein said middleware comprises a traffic generation driver configured to verify that a plurality of driver test vectors received from a traffic generator external to said processors are correct.

9. The apparatus according to claim 1, wherein said middleware is further configured to receive from a user a plurality of selections corresponding to one or more of (i) a plurality of test suites, (ii) a plurality of hardware configurations of said processors and (iii) a plurality of software configurations of said operating systems used during said test of said software modules.

10. The apparatus according to claim 1, wherein said apparatus is implemented as one or more integrated circuits.

11. A method for middleware testing of software, comprising the steps of:
   (A) generating a plurality of initial test vectors to test one or more software modules executed on a plurality of processors, wherein said initial test vectors have a format that is independent of (i) a plurality of hardware dependencies of said processors and (ii) a plurality of software dependencies of a plurality of operating systems executed by said processors;
   (B) generating a plurality of modified test vectors translated from said initial test vectors by executing middleware, wherein said modified test vectors have another format that matches (i) said hardware dependencies of said processors and (ii) said software dependencies of said operating systems; and
   (C) generating a plurality of test results by exercising said software modules with said modified test vectors.

12. The method according to claim 11, wherein said processors form part of a multicore communication processor.

13. The method according to claim 11, further comprising the step of:
   abstracting said software dependencies of said operating systems using an operating system abstraction layer of said middleware such that said modified test vectors function with each of said operating systems.

14. The method according to claim 11, further comprising the step of:
   loading one or more drivers specific to said operating systems using an operating system abstraction layer of said middleware.

15. The method according to claim 11, further comprising the step of:
   abstracting said hardware dependencies of said processors using a hardware abstraction layer of said middleware such that said modified test vectors function with one or more of (i) a homogeneous cluster of said processors and (ii) a heterogeneous cluster of said processors.

16. The method according to claim 15, wherein said abstracting of said hardware dependencies comprises the step of:
   selecting one or more executable files that have been compiled for said processors.

17. The method according to claim 11, further comprising the step of:
   generating one or more of said modified test vectors by translating a plurality of driver test vectors in a traffic generation driver of said middleware, wherein said driver test vectors are received from a traffic generator external to said processors.

18. The method according to claim 11, further comprising the step of:
   verifying that a plurality of driver test vectors received from a traffic generator external to said processors are correct using a traffic generation driver of said middleware.

19. The method according to claim 11, further comprising the step of:
   receiving from a user a plurality of selections corresponding to one or more of (i) a plurality of test suites, (ii) a plurality of hardware configurations of said processors and (iii) a plurality of software configurations of said operating systems used during said test of said software modules.

20. An apparatus comprising:
   means for processing configured to generate a plurality of initial test vectors to test one or more software modules executed on said means for processing, wherein said initial test vectors have a format that is independent of (i) a plurality of hardware dependencies of said means for processing and (ii) a plurality of software dependencies of a plurality of operating systems executed by said means for processing;
   means for generating a plurality of modified test vectors translated from said initial test vectors by executing middleware, wherein said modified test vectors have another format that matches (i) said hardware dependencies of said means for processing and (ii) said software dependencies of said operating systems; and
   means for generating a plurality of test results by exercising said software modules with said modified test vectors.

* * * * *